(12) United States Patent
Crist et al.

(10) Patent No.: US 7,187,291 B2
(45) Date of Patent: Mar. 6, 2007

(54) CONTROL SYSTEM AND METHOD FOR REMOTE LAUNCHERS

(75) Inventors: Timothy J. Crist, Tucson, AZ (US); Timothy T. Duncan, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 172 days.

(21) Appl. No.: 10/773,138

(22) Filed: Feb. 5, 2004

(65) Prior Publication Data
US 2005/0172912 A1 Aug. 11, 2005

(51) Int. Cl.
  *G08B 23/00* (2006.01)
(52) U.S. Cl. ............... 340/573.3; 340/573.1; 340/652; 340/687; 42/105; 119/29; 119/720
(58) Field of Classification Search ............. None
  See application file for complete search history.

(56) References Cited

U.S. PATENT DOCUMENTS

| | | | | |
|---|---|---|---|---|
| 4,898,120 A | * | 2/1990 | Brose | 119/721 |
| 5,666,908 A | * | 9/1997 | So | 119/720 |
| 5,983,551 A | * | 11/1999 | Lalor | 42/105 |
| 6,104,238 A | * | 8/2000 | Mattisson et al. | 329/319 |
| 6,170,439 B1 | * | 1/2001 | Duncan et al. | 119/720 |
| 6,249,552 B1 | * | 6/2001 | Cana et al. | 375/319 |
| 6,307,476 B1 | * | 10/2001 | Smith et al. | 340/573.1 |
| 6,315,601 B1 | * | 11/2001 | Sasaki et al. | 439/488 |
| 6,347,476 B1 | * | 2/2002 | Cullen et al. | 42/105 |
| 6,487,991 B2 | * | 12/2002 | So | 119/429 |
| 6,549,133 B2 | | 4/2003 | Duncan et al. | 340/573.3 |
| 6,598,563 B2 | * | 7/2003 | Kim et al. | 119/720 |

OTHER PUBLICATIONS

Remote Release 150 System, "Tri-Tronics Electronic Dog Training Equipment" brochure, p. 22.

* cited by examiner

*Primary Examiner*—Benjamin C. Lee
*Assistant Examiner*—Son Tang
(74) *Attorney, Agent, or Firm*—Cahill, von Hellens & Glazer P.L.C.

(57) ABSTRACT

A remotely controlled device (3) for controlling a remotely controlled launcher for dog training includes receiving circuitry (26,27) for receiving control information signals from a remote transmitter (2), controller (40) coupled to receive demodulated information from the receiving circuitry (26, 27) and adapted to generate a control signal in response to the demodulated information, a coupling device (21A) for coupling the control signal to a control input of the animal training device (14-1), and a test circuit (33) responsive to a test switch (16) for testing continuity of the coupling by the coupling device (21A).

26 Claims, 8 Drawing Sheets

| 16 TIMING PULSES | IDMSB (1 BYTE) | IDMB (1 BYTE) | IDLSB (1 BYTE) | FUNCTION (1 BYTE) | CKSUM (1 BYTE) | 1400 MICRO-SECONDS | IDMSB (1 BYTE) |
|---|---|---|---|---|---|---|---|

CONTROL SYSTEM AND METHOD FOR REMOTE LAUNCHERS

BACKGROUND OF THE INVENTION

The present invention relates generally to control of remote launching devices or "launchers" used by dog trainers to remotely launch retrievable "dummy" devices or the like such as decoys or "bumpers", and/or to remotely launch live birds and/or dead birds. More particularly, the present invention relates to a remote control system including a transmitter and a receiving unit connected to a mechanical launcher and operative to actuate a mechanical releasing mechanism that launches the dummy.

Some known launchers include relatively large frames supporting a mechanism which stretches a sling-shot-like mechanism that can be released by a solenoid or servomechanism so as to propel a dummy. Other known launchers utilize blank gun cartridges or primers which are fired in response to actuation of a solenoid to produce an explosion that propels the dummy. Some of the known sling-shot-like launchers also cause a firing pin to strike a blank cartridge causing it to produce a loud gun-shot-like sound at the location of a launcher when it is released. U.S. Pat. No. 5,983,551, entitled "Remote-controlled Apparatus and Method for Training Retrieving Dogs" issued Nov. 16, 1989 to Lalor, describes a complex launcher in which each of several release mechanisms are independently pivotable on a single frame. Each release mechanism includes a firing chamber, a firing pin, a trigger mechanism for actuating the firing pin to fire a blank cartridge in the firing chamber, a launch barrel capturing explosive release of gas from the blank cartridge to launch a retrieving dummy, and a solenoid connected to actuate the trigger mechanism. A receiver unit receives signals from a remote transmitter to selectively actuate the solenoids to sequentially launch the dummies.

Some launchers are more suitable for "pointing" breeds of dogs such as, English Pointers, German Shorthair Pointers, and Brittany Spaniel Pointers. Other launchers are more suitable for "flushing" breeds of dogs such as Springer Spaniels and English Spaniels. The "pointer" breeds are referred to as "pointers", and the flushing breeds are referred to as "flushers". The term "bird dogs" includes both pointers and flushers.

In the training of bird dogs, the main object usually is to teach the dogs the discipline of being "steady to the flush" (when flushed birds fly) and "steady to the shot" (when a bird has been shot and falls to the ground) and to use their noses to independently find live birds that have been released or dead birds that have been launched, such as pheasant, quail, and woodcock. (By way of definition, the term "launcher" as used herein is intended to encompass either/both a remotely controlled device which propels a dummy or dead bird a substantial distance and/or and a remotely controlled device which releases a live bird or animal.)

In the training of retrievers, such as Labradors, Chesapeakes, and Golden Retrievers, the main object usually is to train the dog to mentally "mark" or remember the locations where launched dummies land, and to retrieve them when commanded. For retrievers, some launch devices are capable of launching a dummy so as to cause the dummy to be propelled to a substantial height (e.g., 20 feet) and to a substantial distance (e.g. 50 feet) before landing. Other launch devices function to open an elevated compartment to release a live bird. Two or three such launchers often are used in a training session for training a retriever in order to simulate a hunting environment to thereby make the training environment realistically complex for the dog.

Most of the known remotely controllable launchers have been controlled by "launch controllers", also referred to herein simply as "controllers", that are marketed separately from the launchers. The controllers typically include an RF transmitter that is operated by the trainer and an RF receiver unit that is physically attached to a launcher. When the receiver unit is remotely actuated, it forces a control current through a solenoid, relay, or servomechanism of the launcher, which triggers the launcher causing it to release or launch the dummy.

The closest prior art is believed to be the assignee's Tri-Tronics Model 150 remote launch controller product. The receiver unit of each Model 150 remote launch controller is set at the factory to recognize a unique transmitter code of a particular remote transmitter, and is capable of being electrically connected to the solenoid of only one launcher. The factory set transmitter code is engraved on the back panel of each receiver unit to indicate which transmitter the receiver unit can respond to. The transmitter of each Model 150 remote launch controller can select any one of 9 receiver units to receive a particular transmission. Each transmitter has 2 trinary address switches that the trainer can toggle to establish which of nine possible receivers can receive the present transmission. Each transmitter also includes a single launch button which, when depressed, transmits a launch signal which can be received only by a receiver that has been factory set to receive from that transmitter and has a recognition address selected by the trinary address switches on the transmitter.

A recent trend in use of remotely controlled launchers is to position them further away (e.g., 200 to 400 or more yards) from the location of the trainer in order to make the training more difficult for the dogs. This, of course, has led to the need for increased reception range of the receiver units used to actuate the launchers.

There are only 200 possible addresses to which the Model 150 remote launch controller can be set to recognize. However, complex training/hunting/competition situations are frequently encountered that result in problems using the prior remotely controlled launching systems, such as the Model 150 remote launch controller, and since each transmitter of a Model 150 remote launch controller can transmit to as many as nine different addresses and there are only 200 possible receiver addresses, there is a substantial possibility of a transmitter causing unintended launches if there are more than 20 to 30 remote launch control transmitters in the same vicinity, which is not an uncommon situation. Furthermore, transmitters used in conjunction with training collars on dogs present in the same general area often use transmitter frequencies and address codes that can be recognized by the receiver units of remote launch controllers, so nearby transmitters being used for other training activities also can cause interference. It is of course very important from a safety viewpoint that there not be any possibility of a launched projectile accidentally hitting someone.

If two or three or more launchers are positioned 300 yards or more from the location at which the trainer remotely actuates them, it is very desirable to be able to test the launch controllers automatically to make sure they are connected correctly before the training exercise begins in order to avoid inconvenience to the trainer and confusion to the dog that naturally results if a sequence for which the dog has been trained is disrupted either by an inadvertent launch or by failure of unexpected launch in response to pressing of the remote transmitter button.

Training of retrievers is usually near water. Usually the launcher is hidden, and it usually is necessary for the trainer or an assistant to walk around ponds or the like to place the launcher 300 or more yards away from where the trainer and dog will be standing initially. In a typical training session, the dog initially is beside the trainer. The trainer stands and "faces", i.e., looks in the direction of, a particular launcher that is to be actuated. The dog has been trained to look in the general direction thus "commanded" by the trainer. The trainer operates the transmitter to actuate one or more launchers, and the dog usually can see where the launched dummies land and is trained to remember that information. When the trainer gives a command, the dog, relying both on its training and its instinct, is supposed to retrieve the launched dummy or dummies.

In contrast, training of bird dogs (pointers and flushers) usually is performed under field conditions in heavy vegetation or "cover", and the launchers usually are hidden behind such cover and often are not be easily seen from where the trainer is initially standing with the dog when the launch is triggered.

Professional dog trainers often train 8 to 20 dogs during a particular training session, and often have at least one assistant. The professional trainer might use as many as 4 or more launchers in order to reduce the number of times the trainer or assistant needs to walk out to the launchers and "reload" them. For retriever training, there are usually three or four launch locations near which the dogs are expected to "mark" or memorize the location of a released dummy and, after an appropriate command, then retrieve the dummies.

A rather large variety of remotely controlled animal training devices are known. Some have the capability of operating a transmitter to remotely controlled the intensity of stimulus produced by a collar-mounted receiver unit. However, none of the prior art remotely controlled animal training devices are known to have the capability of allowing remote reprogramming or reconfiguring of the function of the remotely controlled receiver unit so as to cause it to perform a different function.

Thus, there is an unmet need for a remotely controlled animal training device which is capable of being remotely programmed to reconfigure or change the function performed by it.

There also is an unmet need for an improved remote launcher control system that has improved range, smaller size, and more receiver address codes than the closest prior art.

There also is an unmet need for an improved remote launcher control system that allows simpler operation of a transmitter to selectively launch dummies from multiple launch devices than the closest prior art.

There also is an unmet need for an improved remote launcher control system that avoids the risk of false or unintended launches much more effectively than the closest prior art.

There also is an unmet need for an improved remote launcher control system that is capable of easily and conveniently testing the integrity of communication between a transmitter and a plurality of receiver units coupled to associated launchers.

There also is an unmet need for an improved remote launcher control system that simplifies the process of finding and collecting launch devices that have been positioned in difficult-to-find places, such as sites that are covered by heavy vegetation or "cover".

SUMMARY OF THE INVENTION

It is an object of the present invention to provide a remotely controlled animal training device which is capable of being remotely programmed or configured to modify the function that the remotely controlled animal training devices capable of performing.

It is another object of the present invention to provide an improved remote launch control system that has an improved range, smaller size, and more receiver address codes than the closest prior art.

It is another object of the present invention to provide an improved remote launch control system that allows simpler operation of a transmitter unit to selectively launch dummies from multiple launchers than the closest prior art.

It is another object of the present invention to provide an improved remote launch control system that avoids the risk of false or unintended launches much more effectively than the closest prior art.

It is another object of the present invention to provide an improved remote launch control system that is capable of testing the integrity of communication between a transmitter and a plurality of receiver units coupled to associated launchers.

It is another object of the present invention to provide an improved remote launch control system that simplifies the process of finding and collecting launchers that have been positioned in difficult-to-find places.

Briefly described, and in accordance with one embodiment, the present invention provides a remotely controlled animal training device (3) including receiving circuitry (26,27) for receiving control information signals including address information and function information from a remote transmitter (2), and a microcontroller (40) coupled to receive demodulated address codes and function codes from the receiving circuitry (26,27), a set switch (17) for setting the remotely controlled animal training device (3) to recognize only an address code received from a particular remote transmitter (2). A first stored routine executed by the microcontroller stores the address code received from the remote transmitter in response to actuation of the set switch (17), and a second stored routine executed by the microcontroller operates on an address code contained in control information signals received by the remotely controlled animal training device (3) and compares the address code to the stored address code to determine if the remotely controlled animal training device (3) is being addressed by the particular remote transmitter (2). The microcontroller then operates on a function code contained in control information signals received by the remotely controlled animal training device (3) if the address code matches the stored address code. The address code may include a sufficient number of bits to essentially eliminate the possibility of accidental actuation of any of a first predetermined number of remotely controlled animal training devices in a training area by any of a second predetermined number of remote transmitters in the training area.

In another embodiment, invention provides a remotely controlled animal training device (3) including receiving circuitry (26,27) for receiving signals from a remote transmitter (2) including function information correlating various settings of a sound selection switch (10) with various sound algorithms, a microcontroller (40) storing the various sound algorithms and coupled to receive demodulated function codes representing the function information from the receiving circuitry (26,27) and a set switch (17) and a first stored routine executed by the microcontroller for storing the function codes in order to configure settings of the sound selection switch (10) to correspond to predetermined sound algorithms, respectively. A second stored routine executed by the microcontroller executes a sound algorithm corresponding to a present setting of the selection switch (10) in response to a sound command from the remote transmitter to produce audio signals determined by the sound algorithm. An acoustic transducer (21) produces sounds in response to the audio signals.

In a described embodiment, the invention provides a remotely controlled controller for controlling a remotely controlled animal training device (14) including receiving circuitry (26,27) for receiving control information signals from a remote transmitter (2), a controller (40) coupled to receive demodulated information from the receiving circuitry (26,27) and adapted to generate a control signal in response to the demodulated information, a coupling device (21A) for coupling the control signal to a control input of the animal training device (14-1), and a test circuit (33) responsive to a test switch (16) for testing continuity of the coupling by the coupling device (21A). In the described embodiment, a remotely controlled animal training device (3) for controlling a launching device (14) includes a microcontroller (40) coupled to receive demodulated information from the receiving circuitry (26,27) and adapted to generate audio signals and first and second launch signals in response to the demodulated information and first (21A) and second (21B) coupling devices for coupling the first and second launch signals to control inputs of first (14-1) and second (14-2) launching devices, respectively, and first (33) and second (36) test circuits coupled to a test switch (16) for testing continuity of the coupling by the first (21A) and second (21B) coupling devices. In the described embodiments, the microcontroller (40) operates to generate a predetermined reference voltage (VREF) and apply it to a reference input (31) of the data slicer circuit (27) wherein the sliced demodulated control information signals (55) swing about a voltage level based on the predetermined reference voltage (VREF). A set switch (17) performs the function of setting address recognition circuitry in the remotely controlled animal training device to recognize an address code transmitted by a particular remote transmitter. In the described embodiment, the first test circuit (33) includes a first transistor (Q8) having a control terminal coupled to the first output (LEFT) of the microcontroller (40), a first terminal coupled to a reference conductor (GND), and a second terminal coupled to the first coupling device (21A) and also coupled by a high resistance (R14) to a control terminal of a second transistor (Q7) having a first terminal coupled to the reference conductor and a second conductor coupled through a first light emitting diode (19A) to a test signal (VTEST) produced in response to actuation of the test switch (16), wherein turning the first transistor (Q8) off with the first coupling device (21A) connected to the control input of the first launching device (14-1) causes the second transistor (Q7) to conduct current through the first light emitting diode (19A) to indicate continuity of the coupling between the first coupling device (21A) and the control input of the first launching device (14-1) when the test switch (16) is actuated without actuating the first launching device. The control information includes address information and function information. The microcontroller executes a stored program to produce address code information recognized by the remotely controlled animal training device (3) and function information for operating the remotely controlled animal training device. The address code includes a sufficient number of bits to essentially eliminate the possibility of accidental actuation of any of a first predetermined number of remotely controlled animal training devices in the training area by any of a second predetermined number of remote transmitters in the training area.

DETAILED DESCRIPTION OF THE PREFERRED EMBODIMENTS

Figure 1:
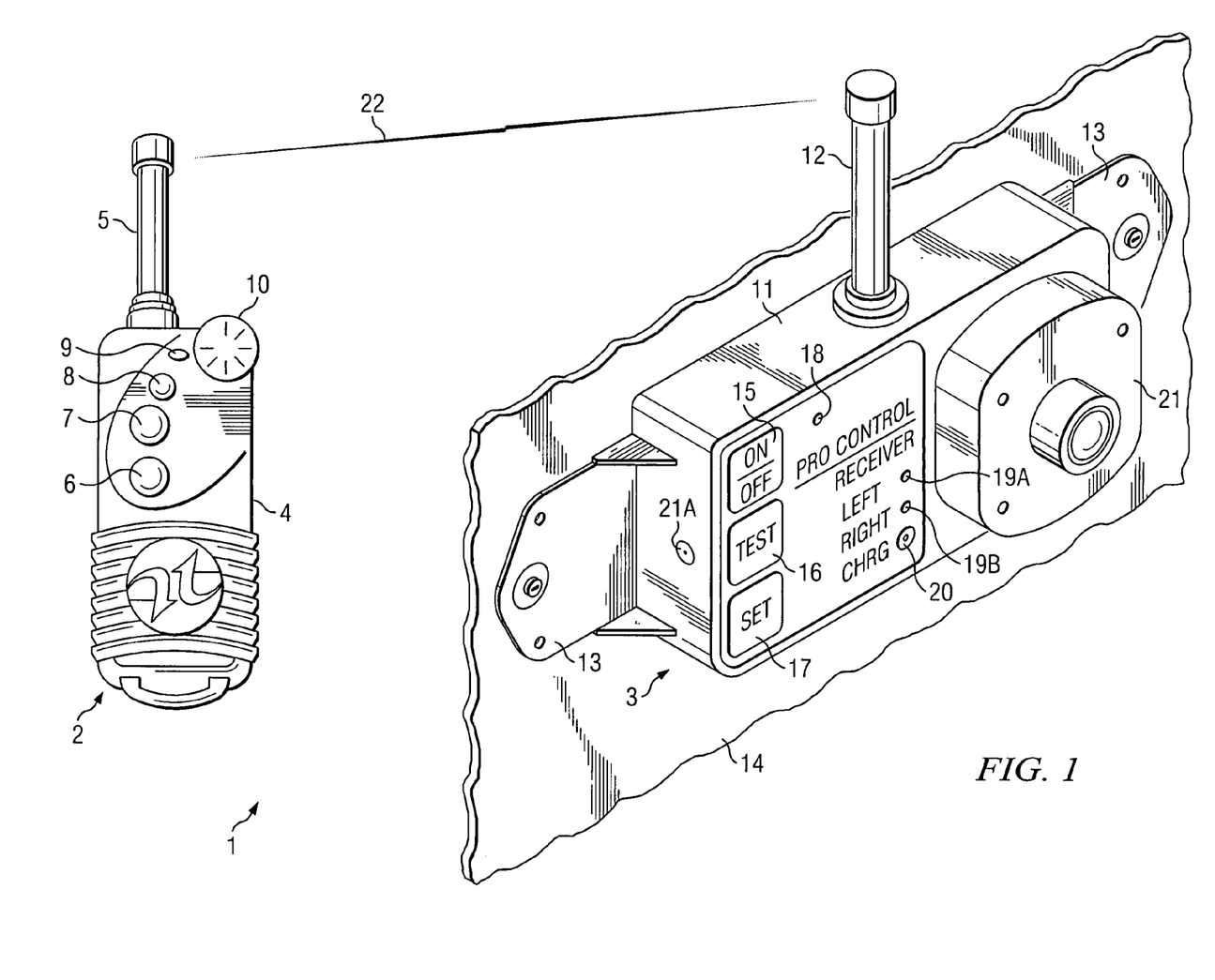
FIG. 1 is a diagram of a remote launch control system 1 including a remote transmitter and a receiver unit connected to a launcher.

Referring to FIG. 1, remote launch control system 1 includes a remote transmitter 2 including a body 4 containing essentially the same circuitry shown in commonly assigned pending application entitled "Remote Transmitter and Method", Ser. No. 09/765,718 filed Jan. 18, 2001, by Duncan et al., issued Apr. 15, 2003 as U.S. Pat. No. 6,549,133, and incorporated herein by reference. Remote launch control system 1 also includes a receiver unit 3 that is attached to a mounting surface of a launch device 14 for launching dummies or birds. Transmitter 2 includes a 3-inch antenna 5 attached to body 4, a thumbwheel switch 10, and a green control button 6 for controlling a launcher that is electrically coupled to a right jack 21A of receiver unit 3, a red control button 7 for controlling a launcher that is electrically coupled to a left jack 21B of receiver unit 3, a yellow button 8 for causing a preselected sound to be emitted by a piezoelectric transducer (PZT) or speaker 21 of receiver unit 3, and an indicator light 9.

Figure 3:
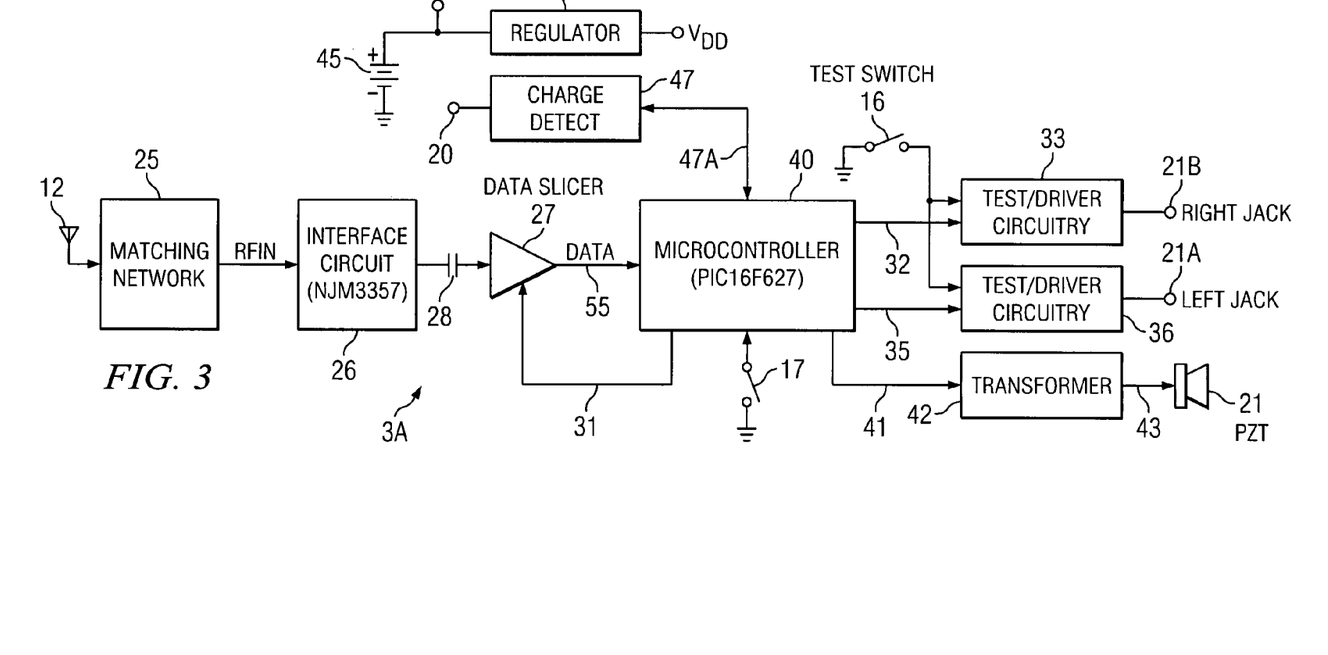
FIG. 3 is a block diagram of the circuitry in the receiver unit in FIG. 1.

Receiver unit 3 includes a 7 inch antenna 12 attached to a body 11 which contains the circuitry indicated in the block diagram of FIG. 3. A pair of mounting brackets 13 are used to attach receiver unit 3 to the surface of a launcher 14 by means of conventional NYLATCH connectors (not shown). Speaker or PZT 21 is attached to the front face of housing 11, and an operating panel including an on-off switch 15, a continuity test switch 16, a set switch 17, a battery charger jack 20, a "right channel" indicator LED 19B and a "left channel" indicator LED 19A, and an "on/off" indicator LED 18 are also located on the front surface of housing 11. The "left channel" launcher control jack 21A is located on the left wall of housing 11, and the similar "right channel" logic control jack 19B (FIG. 5A) is similarly located on the right wall of housing 11. Launcher 14 can be any of a wide variety of bird or dummy launchers, including those of the type previously described. Set switch 17 is coupled to a digital input of microcontroller 40 as shown in subsequently described FIG. 3 to cause it to allow the user to set an internal address recognition function of receiver unit 3 to match the address code transmitted by a particular remote transmitter 2. This allows the user to set a number of receiver units 3 to recognize the address code of a single transmitter unit 2 which the user already owns, and avoids the need for the user to buy a complete set including a transmitter 2 and a receiver unit 3 that has been factory preset to recognize the address code of that transmitter. As subsequently explained, set switch 17 also allows the user to match particular settings 1–7 of thumbwheel switch 10 to correspond to desired sound algorithms to cause PZT transducer 21 of receiver unit 3 to emit selected sound patterns.

Figure 2:
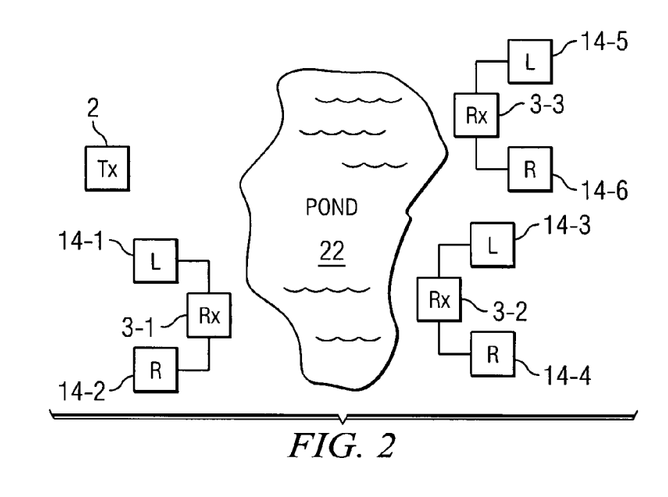
FIG. 2 is a plan view diagram of a field or countryside area in which the system of FIG. 1 is set up for use.

FIG. 2 shows an plan view diagram of a typical scene in which the trainer initially holds transmitter 2, and a retriever or bird dog initially stands near the trainer. The trainer may be located several hundred yards from a pond 22, and there may be various kinds of trees, shrubs, and other vegetation or cover in the vicinity. Two typical launchers 14-1 and 14-2 are electrically coupled to the left and right launch control jacks of a first receiver unit 3-1, two additional launchers 14-3 and 14-4 are electrically coupled to a second receiver unit 3-2, and two more launchers 14-5 and 14-6 are electrically coupled to a third receiver unit 3-3, as shown. The launchers typically are located 200 to more than 400 yards from the initial location of the trainer and transmitter 2.

Referring to FIG. 3, the receiver circuitry 3 in housing 11 of receiver unit 3 includes a matching network 25 having an input coupled to antenna 12 and an output connected to apply a signal RFIN to the input of an FM IF (intermediate frequency) circuit 26, which can be an NJM3357 low power narrowband FM IF integrated circuit available from New Japan Radio Company, Limited. The output of IF circuit 26 is coupled by a capacitor 28 to an input of a conventional data slicer circuit 27 having an output 55 coupled to a data input of a microcontroller 40, which can be a PIC 16F627 flash-based 8-bit CMOS microcontroller available from Microchip Technology Incorporated. Microcontroller 40 provides a feedback reference signal 31 to data slicer 27. Microcontroller 40 produces an audio output on conductor 41 that is applied to the primary winding of a transformer 42, the secondary winding of which is connected by a conductor 43 to drive a PZT (piezoelectric transducer) 21. Microcontroller 40 produces an analog left channel launch control signal on conductor 35, which is connected to an input of a left channel test/driver circuit 36, the output of which is connected to left launch output jack 21A. Microcontroller 40 also produces an analog right channel launch control signal on conductor 32, which is connected to an input of a right channel test/driver circuit 33, the output of which is connected to right launcher output jack 21B.

Test switch 16 is coupled to a test signal input of each of test/driver circuits 33 and 36. A 9 volt battery 45 has its (−) terminal connected to ground and its (+) terminal connected to the input of a voltage regulator circuit 46, which produces a supply voltage VDD. A circuit 47 for detecting whether a battery charger is plugged into battery charger jack 20 is connected between battery charger jack 20 and microcontroller 40.

Figure 4:
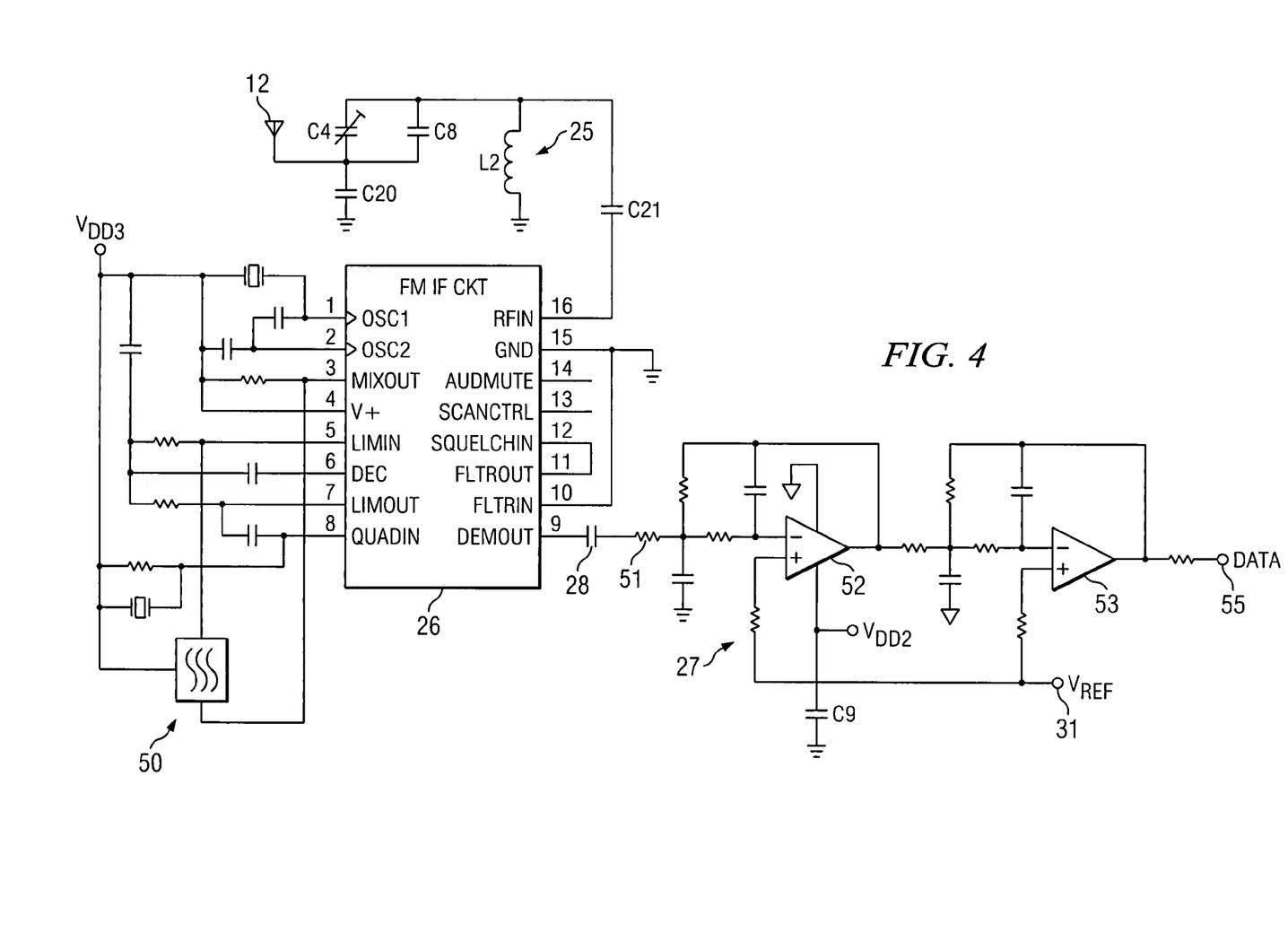
FIG. 4 is a schematic diagram of the matching network, intermediate frequency (IF) circuit, and data slicer of FIG. 3.

Referring to FIG. 4, the matching network 25 of FIG. 3 is a conventional circuit that includes capacitors C4, C20, C6 and capacitor C21 and inductor L2 connected as shown to the RFIN input of IF circuit 26. Reference numeral 50 in FIG. 4 illustrates conventional circuitry including an IF (intermediate frequency) filter of the receiver chip, including various capacitors and resistors, a 26.591 MHz crystal and a 455 kHz crystal connected as shown to the various oscillator and control inputs and outputs of IF circuit 26. Coupling capacitor 28 is coupled between demodulator output DEMOUT and the input of data slicer circuit 27. Data slicer 27 is a conventional amplifier and filter circuit that controls the series of data bytes to determine "1"s and "0"s thereof and effectively cleans up the "hash and trash noise" coming out of IF circuit 26. Data slicer 27 includes operational amplifiers 52 and 53 coupled between coupling capacitor 28 and data output terminal 55 as shown, with the (+) inputs of operational amplifiers 52 and 53 being coupled to a feedback reference voltage VREF produced by microcontroller 40 on conductor 31, as shown.

Figure 6:
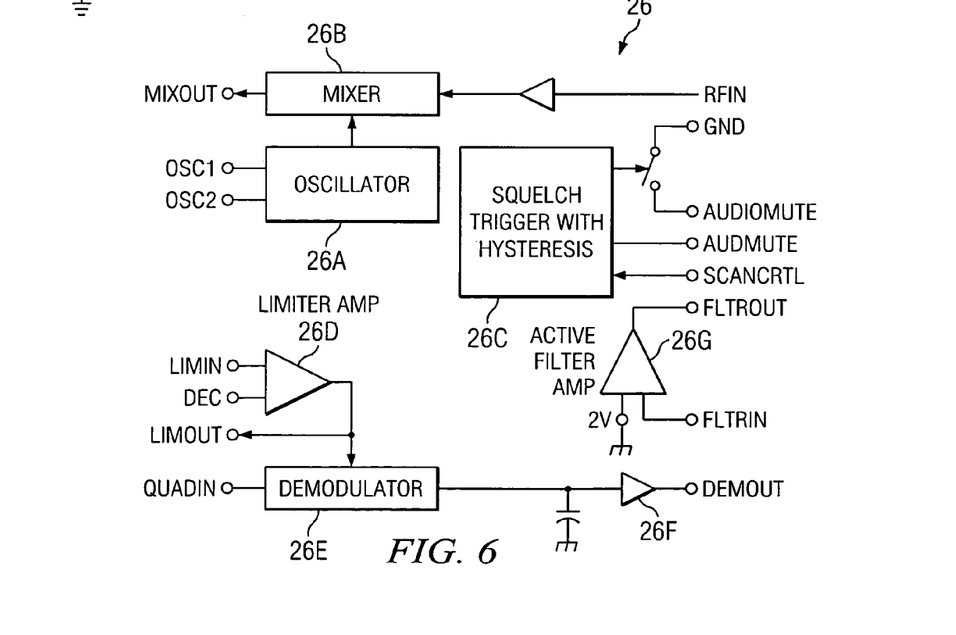
FIG. 6 is a schematic diagram of the IF circuit 26 in FIG. 4.

The details of IF circuit 26 are shown in FIG. 6. Specifically, IF circuit 26 includes an oscillator 26A the output of which is connected to a mixer 26B. A limiter amplifier 26D produces the signal LIMOUT in response to the signals DEC and LIMIN of IF circuit 26. A demodulator 26E and an amplifier 26F together produce a signal DEMOUT in response to the IF circuit signals LIMOUT and QUADIN. An active filter amplifier 26G produces a signal FLTROUT in response to the IF circuit signal FLTRIN. A squelch trigger and hysteresis circuit 26C also is included. The signal RFIN is coupled through a buffer to an input of mixer 26B.

Figure 5A:
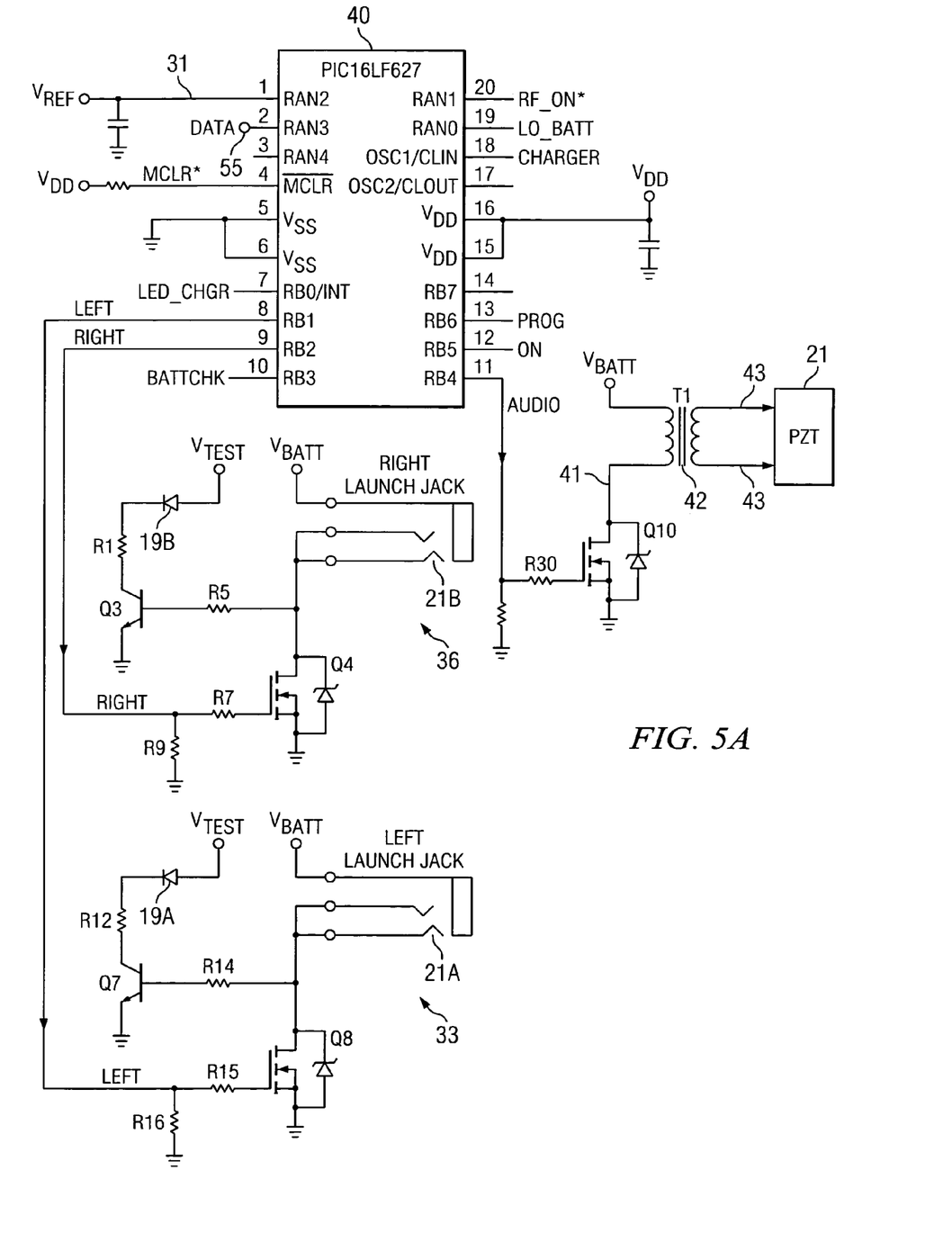
FIG. 5A is a schematic diagram of part of the circuitry in the block diagram of FIG. 4.
Figure 7:
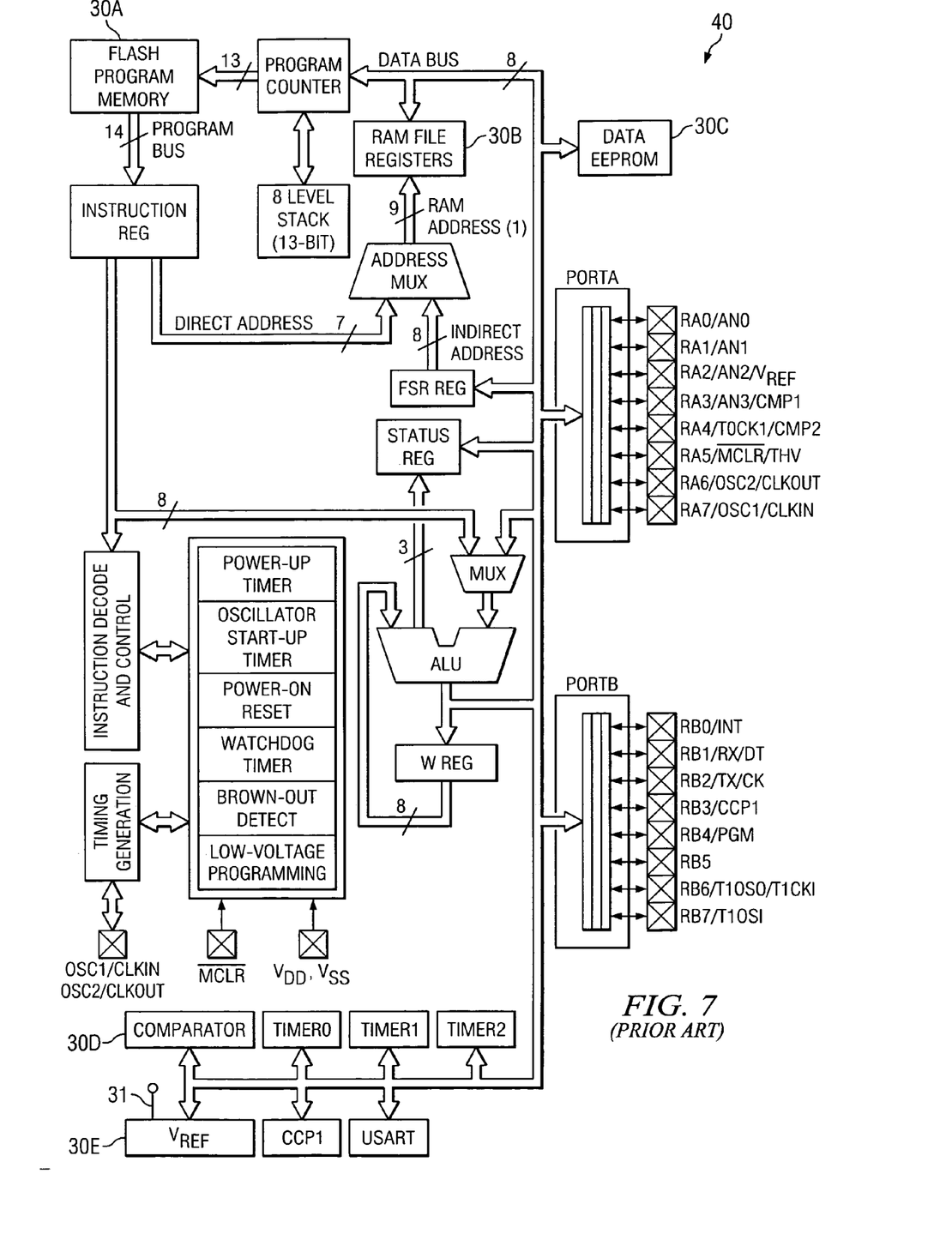
FIG. 7 is a schematic diagram of the microcontroller 40 in FIG. 5A.

Referring to FIG. 5A, the audio output signal AUDIO of microcontroller 40 is coupled through a resistor R30 to the gate of an N-channel field effect transistor Q10 having its source connected to ground and its drain connected by conductor 41 to one terminal of the primary winding of transformer 42. The other terminal of transformer 42 is connected to the battery voltage VBATT. The secondary winding of transformer 42 is connected by conductor's 43 piezoelectric transducer 21. (The details of microcontroller 40 are shown in FIG. 7, wherein microcontroller 40 includes an internal oscillator, a flash memory 30A, a random access memory 30B for storing file registers, and a non-volatile EEPROM 30C for storing the operating program and sound algorithms subsequently referred to. Microcontroller 40 also includes a comparator 30D which generates the data input signal DATA own conductor 55, and also includes a circuit 30E that generates the reference signal VREF on conductor 31.)

The VREF generation circuit 30E of microcontroller 40 produces a reference voltage VREF on conductor 31 (FIGS. 3 and 4), about which the output of IF circuit 26 is capacitively coupled to data slicer 27 swings. VREF in microcontroller 40 is connected to the internal comparator in block 30D of FIG. 6 to achieve a low error for the comparison. The comparison error is reduced by connecting a reference point of microcontroller 40 to the reference point 31 of the data produced on conductor 55 by data slicer 27. The output of the comparator in block 30D is the signal "Received Data" which is received during the step in block 69 of FIG. 10.

The use of an internal oscillator in microcontroller 40 allows use of fixed pulse widths for synchronizing on the edges the Received Data signal, and whatever error there is between signals transmitted by transmitter 2 and data signals produced during the operation of microcontroller 40 in launch controller 3 can be recalibrated to the present data speed every time a pulse of the Received Data signal is received. The resulting improved precision provides substantially improved performance at greater distances between transmitter 2 and launch controller 3.

In FIG. 5A, left channel test/driver circuit 33 includes an N-channel field effect transistor Q8 having its gate coupled also to one terminal of a resistor R15, the other terminal of which is connected to the analog output signal LEFT of microcontroller 40 and to one terminal of a resistor R16, the other terminal of which is connected to ground. The source of transistor Q8 is connected to ground, and its drain is connected to one conductor of left launch jack 21A and to one terminal of a 100 kilohm resistor R14, the other terminal of which is connected to the base of an NPN transistor Q7. The other terminal of left launch jack 21A is connected to VBATT. The emitter of transistor Q7 is connected to ground, and its collector is connected to one terminal of 330 ohm resistor R12, the other terminal of which is connected to the cathode of the above mentioned light emitting diode 19A, the anode of which is connected to the continuity test signal VTEST.

Similarly, right channel test/driver circuit 36 includes an N-channel field effect transistor Q4 having its gate coupled to one terminal of a resistor R7, the other terminal of which is connected to the analog output signal RIGHT of microcontroller 40 and to one terminal of a resistor R9, the other terminal of which is connected to ground. The source of transistor Q4 is connected to ground, and its drain is connected to one conductor of right launch jack 36 and to one terminal of a 100 kilohm resistor R5, the other terminal of which is connected to the base of an NPN transistor Q3. The other terminal of right launch jack 36 is connected to VBATT. The emitter of transistor Q3 is connected to ground, and its collector is connected to one terminal of 330 ohm resistor R1, the other terminal of which is connected to the cathode of above-mentioned light emitting diode 19B, the anode of which is connected to VTEST.

The self-test capability of receiver unit 3 provided by the self-test circuits 33 and 36 of FIG. 5A has the advantages of requiring very low current. The design of test/driver circuits 33 and 36 in FIG. 5A allows a single simple circuit to function both as a high current solenoid driver and also as a low current continuity tester to determine if the solenoids of the launchers are properly connected without actuating the launchers.

The self-test technique described herein allows the continuity of the controller solenoid connections to the left and right launch jacks to be remotely tested, without dissipating much power. If NPN transistor Q4 or Q8 is turned off, full current is supplied from VBATT to the corresponding solenoid coupled to right jack 21B or left jack 21A, which triggers the launch mechanism of the launcher 14 and causes a dummy to be launched or a live bird to be released. The test comes off of the low side. The resistance connected to the bases of NPN transistors Q3 and Q8 is very high. Pressing the test button 16 completes the circuit connection through LED 19A and/or 19B, causing a current flow through LED 19A and/or 19B if launcher solenoids are connected thereto and thereby turns on transistor Q3 and/or transistor Q7. This provides the advantages of hard wired, low-cost, low overhead, low current circuitry that can test the continuity of the remote circuitry without actuating it and without causing an inadvertent launch. The two output jacks 21A and 21B of launch controller 3 are effectively coupled parallel to accomplish the continuity test, and a single test switch 16 is used for simultaneous self-testing of both channel connections without actuating solenoids connected to output jacks 21A and 21B.

The self-test aspects of launch controller provide a good level of assurance that the solenoids of the remote launcher 14 are connected properly to the launch jacks of launch controller 3 before the launching signals from the remote transmitter 2 are generated.

Figure 5B:
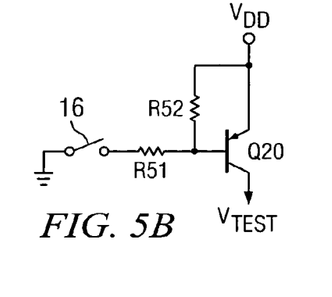
FIG. 5B is a schematic diagram of another part of the circuitry in the block diagram of FIG. 4.

FIG. 5B shows a circuit which generates the continuity test signal VTEST in response to pressing of the momentary continuity test switch 16, also shown in FIG. 1. This turns on a PNP transistor Q20 by grounding one terminal of a resistor R51 having its other terminal connected to the base of transistor Q20 and to one terminal of a resistor R52 having its other terminal connected to VDD and to the emitter of transistor Q20 to produce a high level of VTEST.

Figure 5C:
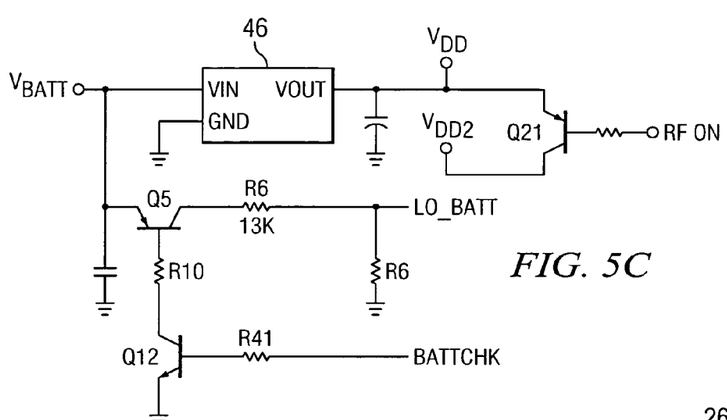
FIG. 5C is a schematic diagram of another part of the circuitry in the block diagram of FIG. 4.

The circuit in FIG. 5C includes a voltage regulator 46, which can be a TC55RP/SOT integrated circuit having its reference input connected to ground and its VIN input connected to VBATT. Its output produces the supply voltage VDD, which is connected to the emitter of a PNP transistor Q21 having its base coupled through a resistor R53 to receive the signal RF ON from microcontroller 40, to thereby produce a supply voltage signal VDD2 on the collector of transistor Q21. The circuit shown in FIG. 5C also includes a battery level indicator circuit including a PNP transistor Q5 having its emitter connected to VBATT and its collector coupled to one terminal of a resistor R6 the other terminal of which is connected to produce an analog signal LO BATT. The signal LO BATT is coupled to microcontroller 40. The collector of transistor Q5 also is connected to one terminal of a resistor R8 the other terminal of which is connected to ground. The base of transistor Q5 is connected to one terminal of a resistor R10 the other terminal of which is connected to the collector of an NPN transistor Q12 having its emitter connected to ground. The base of transistor Q12 is connected to one terminal of a resistor R41 the other terminal of which is connected to receive a signal BATTCHK from microcontroller 40.

Figure 5D:
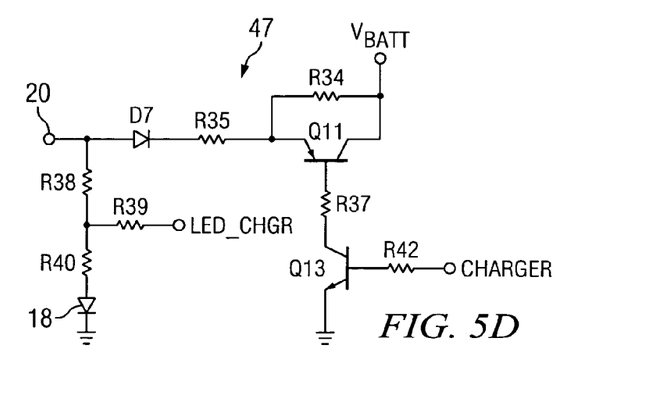
FIG. 5D is a schematic diagram of another part of the circuitry in the block diagram of FIG. 4.

Referring to FIG. 5D, the circuit 47 includes a diode D7 having its anode connected to battery charger jack 20 and to one terminal of a resistor R38, the other terminal of which is connected to one terminal of each of resistors R39 and R40. The other terminal of resistor R39 is coupled to the LED CHGR terminal of microcontroller 40. The other terminal of resistor R40 is connected to the anode of above-mentioned light emitting diode 18 (also shown in FIG. 1), the cathode of which is connected to ground. The cathode of diode D7 is connected to one terminal of a resistor R35. The other terminal of resistor R35 is connected to the emitter of a PNP transistor Q11 and one terminal of a resistor R34, the other terminal of which is connected to VBATT. The other terminal of resistor R34 also is connected to VBATT and the collector of transistor Q11. The base of transistor Q11 is connected to one terminal of resistor R37, the other terminal of which is connected to the collector of an NPN transistor Q13, the emitter of which is connected to ground. The base of transistor Q13 is connected to one terminal of resistor R42, the other terminal of which is connected to a signal CHARGER produced by microcontroller 40.

Figure 8:
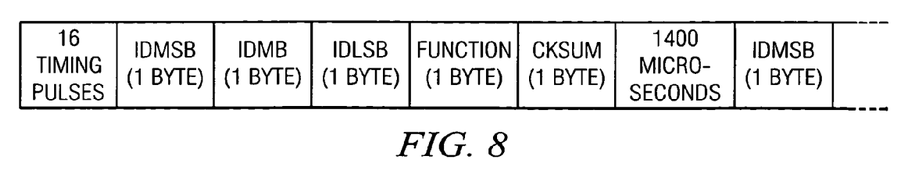
FIG. 8 is a diagram of a model of the data transmission scheme for the remote launch control system 1 of FIG. 1.

Referring to FIG. 8, the transmission scheme or protocol for system 1 includes transmission of 16 timing pulses, followed by a packet of information including three consecutive identification bytes constituting the address or identification of the particular receiver unit to which the transmission is intended, including a most significant identification byte (MSB), a middle identification byte (MB). The LSB byte is followed by a one-byte function code FUNCTION, and that is followed by a checksum byte CHKSUM. The checksum byte is followed by a 1400 microsecond delay before the packet of three ID bytes are re-sent. A parity bit at the end of that sequence is checked. As subsequently explained with reference to block 71 of the flowchart in FIG. 10, the three ID bytes are "verified" to ensure that they conform to the established protocol indicated in FIG. 8, and then they are decoded. Then the decoded function is executed by microcontroller 40.

Figures 9, 11:
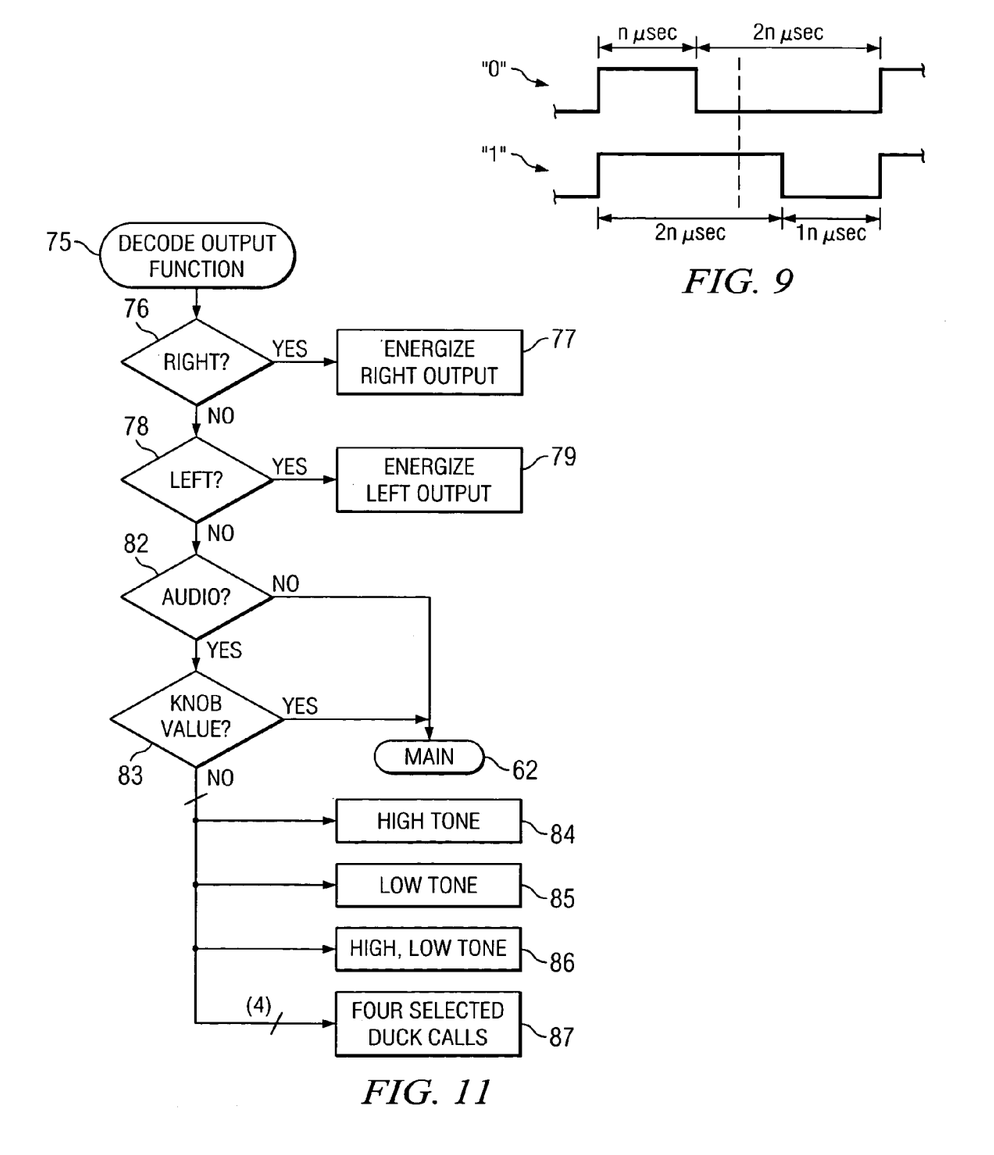
FIG. 9 is a timing diagram useful in describing the operation of the remote launch control system 1 of FIG. 1.
FIGS. 10 and 11 constitute a simplified program flow chart useful in explaining the operation of microcontroller 40 of FIG. 3 to perform the remote launching operations of the system of FIG. 1.

FIG. 9 illustrates the timing of the DATA signal bits which constitute a logical "0" and a logical "1" produced on conductor 55 by data slicer 27. A logical "0" includes a 600 microsecond high level followed by a 1200 microsecond low level and a logical "1" includes a 1200 microsecond high level followed by a 600 low level.

The above-described protocol advantageously keeps the limiter pulse widths in a narrow range, which avoids the usual difficulty of receiver circuitry missing a very narrow pulse which follows a very wide pulse. The above described protocol provides a series of pulses, and when the receiver circuitry 26 is "looking for" data, it first receives the timing pulses, and after it receives a certain number of pulses (16 pulses in the presently described embodiment) or a certain sequence of pulses from transmitter 2, the software executed by microcontroller 40 verifies that it is receiving a string of timing pulses and then captures several of the timing pulses, determines an average pulse width, synchronizes the pulse widths and determines when to expect the next pulse edge. The most significant byte ID MSB, middle byte ID MB, and least significant byte ID LSB are sent, providing a large number of individual codes that represent the present function. The codes are combined into a checksum for code verification. There is a 3*n time interval for each bit wherein a leading edge followed by trailing edge always represents either a "0" or a "1", and the signal level at the middle of the 3*n interval reliably indicates whether the present it is a "1" or a "0", thereby providing a wide tolerance band for recognizing the value of the present bit. Because of the consistent pulse widths, there is no skewing of data because of unusually wide pulses. This permits the receiver circuitry to focus in on the bandwidth so as to provide fixed data bandwidth and to allow tightening of data filtering, and thereby provide more reliable decoding of "1"s and "0"s.

Launch controller 3 receives data from transmitter 2, operates on the data, and if the data is correct, microcontroller 40 either produces certain sound signal based on the sound algorithms that are stored in flash memory to speaker or PZT 21 of the receiver unit 3.

Whenever any action is being performed in receiver unit 3, including reception of data from transmitter 2, and also when the set mode is established in response to set switch 17 to match the address recognition function of receiver unit 3 to that of a particular remote transmitter 2, LED 18 is turned on by microcontroller 40 as indicated in block 71A of the flowchart of subsequently described FIG. 10. As indicated in block 70, the signal LED CHGR shown in FIG. 5D enables microcontroller 40 to control the rate of flashing of LED 18 in accordance with the determination is indicated in block 70 of FIG. 10 and according to whether set switch 17 is actuated. The same LED 18 also is turned on by the circuitry including transistor Q13 shown in FIG. 5D to indicate if the battery charger is plugged in and is charging battery 45. The same LED 18 also indicates if the battery voltage VBATT is low. Thus, visual feedback regarding "matching" operation of receiver unit 3 to a particular remote transmitter 2 and to particular desired sound algorithms is conveniently provided to the trainer by means of the single LED 18.

The flashing rate of LED 18 associated with the function of matching the settings thumbwheel switch 10 with the various sound algorithms indicated in blocks 84, 85, 86 and 87 of FIG. 11 is established by the contents of the FUNCTION byte shown in FIG. 8. The FUNCTION byte contains information that corresponds to particular positions indicated by indicia on thumbwheel switch 10, and that information is stored or "memorized" by microcontroller 40. The software executed by microcontroller 40 decodes the presently selected position of thumbwheel switch 10 in response to pressing of switch 8 of remote transmitter 2 and uses the decoded information to select a particular one of the sound algorithms indicated in blocks 84, 85, 86 and 87 of FIG. 11 to be executed by microcontroller 40.

The software executed by microcontroller 40 causes LED 18 to blink at a rate of one flash every four seconds when the power receiver unit 3 is turned on by actuating switch 15, provided that battery 45 is adequately charged. If battery 45 is undercharged, LED 18 blinks at a faster rate of one flash every second.

In order to match the address recognition function of receiver unit 3 to an address being transmitted by a particular remote transmitter 2, set switch 17 is depressed, i.e., closed, whereupon the software executed by microcontroller 40 causes LED 18 to be turned on steadily while receiver unit 3 weights for a transmitted and received signal to be validated during a 4 second time frame. During that 4 second time frame, receiver unit 3 decodes and stores, i.e., memorizes, the address contained in that particular signal received from a particular remote transmitter such that receiver unit 3 in the future will recognize transmission only from that particular remote transmitter. Once that has occurred and the data received has been verified, the software executed by microcontroller 40 turns off LED 18, and then causes it to flash once to indicate the receiver unit 3 has received a valid transmission. The software then turns receiver unit 3 off.

The self testing operation of receiver unit 3 is visually indicated by means of LEDs 19A and 19B, in response to actuation of test switch 16 in FIGS. 1, 3 and 5B. (Test switch 16 also could be provided on transmitter 2 instead of receiver unit 3, in which case the RF link between the transmitter 2 and the receiver unit 3 could be utilized to actuate circuitry substantially similar to that shown in FIG. 5B to turn on transistor Q20.)

Figure 10:
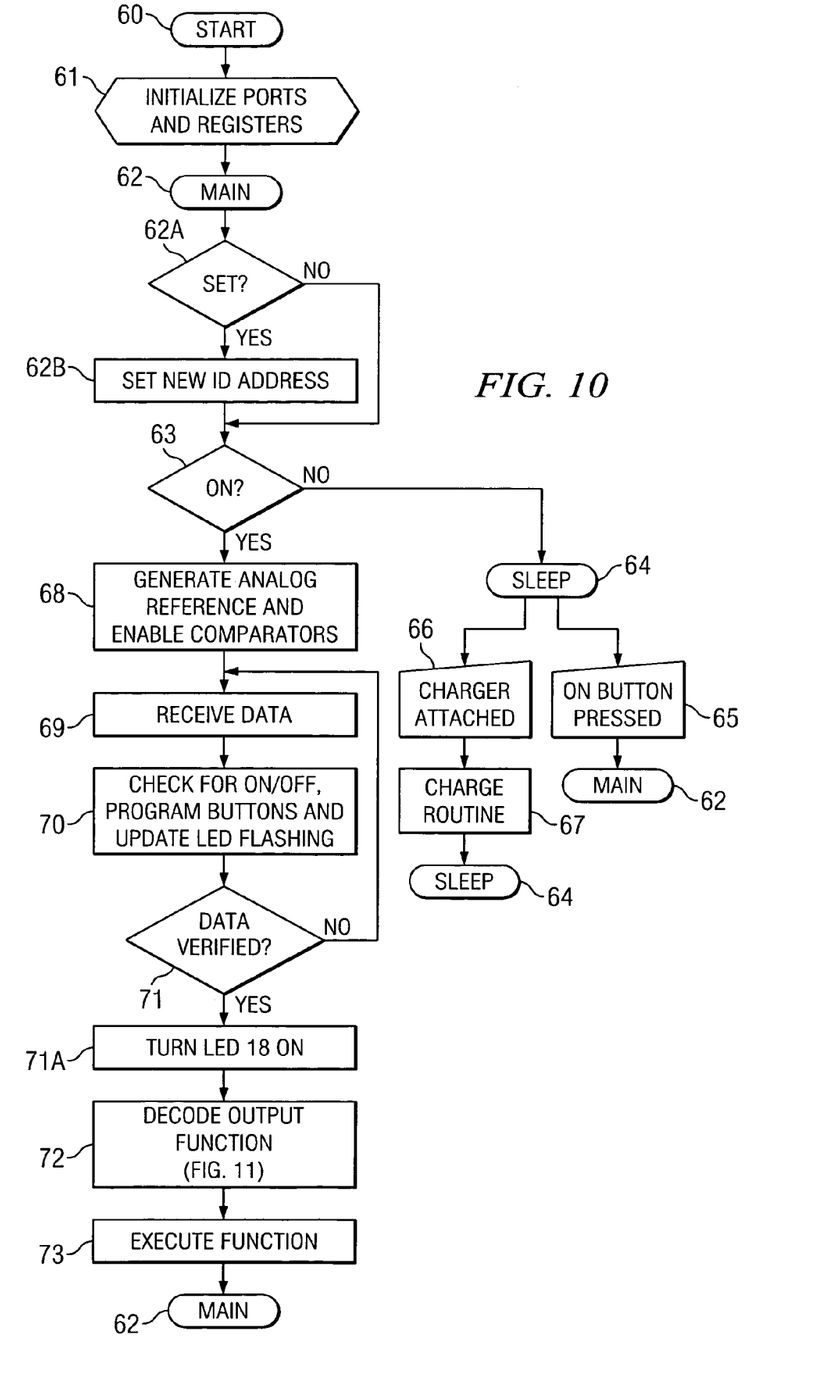

FIGS. 10 and 11 constitute a flowchart of the software executed by microcontroller 40 to cause operation of launch controller 3. In FIG. 10, program begins at label 60 and goes directly to block 61 and initializes the various ports and registers of microcontroller 40, enters the main loop of the program at label 62. The program then goes to decision block 62A and determines whether set switch 17 is closed. If this determination is affirmative, program goes to block 62B and sets, i.e. stores or memorizes, the presently transmitted ID address (shown in FIG. 8) has a new ID address which will be the one recognized in the future by receiver unit 3. Also, information in the FUNCTION code shown in FIG. 8 is also stored or memorized. In any case, the program then enters decision block 63. In decision block 63, the program determines if launch controller 3 is turned on, and if this determination is affirmative, the program goes to block 64 and generates an analog reference signal VREF on conductor 31 and enables the internal comparators in block 30D of FIG. 7 to determine whether an incoming signal is a logical "0" or a logical "1". The program then goes to block 69 and receives data input signal DATA on conductor 55. The program then goes to block 70, checks the status of on/off switch 15 and the "program switch", ie., set switch 17, and causes appropriate flashing of the LEDs 18, 19A and 19B.

The program then goes to decision block 71 and determines if the data received in block 69 is verified by determining if it complies with the protocol previously described with reference to FIGS. 8 and 9. If the determination of decision block 71 is negative, the program reenters block 69 and continues to look for new received data. If the determination of decision block 71 is affirmative, the program goes to block 72 and executes the "decode output function" routine of FIG. 11, and then goes to block 73 and executes the decoded output function. The program then reenters the main loop at label 62.

If the determination of decision block 63 is that launch controller 3 is off, the program determines that launch controller 3 is in its sleep mode, as indicated by label 64, and monitors the status of on/off switch 15, as indicated in block 65, and reenters the "on" or active mode via main loop label 62 whenever on/off switch 15 is actuated. The sleep subroutine also determines in block 66 if an operative battery charger is connected to charging jack 20 and if this is the case, executes a battery charger routine, as indicated in block 67, and then returns to label 64.

Referring to FIG. 11, the "Decode Output Function" routine of block 72 in FIG. 10 is entered at label 75 and goes first to decision block 76 and determines if the right output jack 21B is to be actuated in response to depressing of switch 6 of transmitter 2. If this determination is affirmative, the program, as indicated in block 76, energizes right output jack 21B to initiate a launch or release. If the determination of decision block 76 is negative, the program goes to decision block 78, and determines if left output jack 21A is to be actuated in response to depressing of switch 7 of transmitter 2. If the determination of decision block 78 is affirmative, the program, as indicated in block 79, energizes left output jack 21A to initiate a corresponding launch or release. If the determination of decision block 78 is negative, the program goes to decision block 82 and determines if an audio output is to be produced by PZT 21 in response to depressing of switch 8 of transmitter 2. If this determination is affirmative, the program goes to decision block 83 and determines the setting (i.e., the one of settings 1–7) indicated by thumbwheel switch 10 of transmitter 2, and accordingly executes the appropriate sound algorithm to generate the selected audio response, which is a high-pitched tone (block 84), a low pitch tone (block 85), a high-pitched tone and a low pitch tone (block a 6), or one of four selected duck calls (block 87). Decision block 83 determines the particular one of the indicated sound algorithms indicated in blocks 84, 85, 86, and 87 to be executed for the present position of thumbwheel switch 10 on the basis of information included in the FUNCTION byte shown in the protocol of FIG. 8. (The sound algorithm executed by microcontroller 40 is similar to that described with reference to FIGS. 5A–D of commonly owned pending patent application "Remotely Controlled Beeper and Method", Ser. No. 10/034,789, filed Dec. 27, 2001 by Duncan et al. and incorporated herein by reference. The various segment frequencies and durations are different for the calls of various, game birds, such as ducks, pheasants, geese, etc. than for those of the hawk screech sound described in the foregoing pending application. However, the required segment frequencies and durations can be readily provided for the sounds or calls of ducks, pheasants, geese, etc. using the same described techniques.) The program then returns to the main loop via label 62. If the determination of decision block 82 is negative, the program returns to the main loop via label 62.

The possibility of an inadvertent launch as a result of a signal received from another remote control transmitter is avoided or reduced by the large number of address codes, features of the communications protocol shown in FIG. 8, and different identity decoding configuration compared to that of other remote trainer products.

In a typical situation, a number of launchers are set up at various locations by connecting their respective solenoids to the launch jacks of one or more launch controllers 3, and continuity of the launch jack connections are tested by pressing test button 16 on each receiver unit 3. Typically, the trainer and the retriever with a stimulus collar then will be positioned at a suitable location. The trainer may select a particular sound using the thumbwheel switch 10 on transmitter 2 and then depress the yellow tone button 8 to cause the PZT 21 of one of the receiver units 3 to emit the desired tone to enable the retriever to recognize and "mark" the location of the first launcher actuated.

However, if the particular launcher is of the kind of that produces a gun-shot-like sound when actuated, the preceding step is unnecessary. In any case, the same procedure is repeated for any additional receiver units 3 that have been previously positioned in the training session vicinity, and then the trainer actuates one or more of the launch jacks 19A, B of one or more of the receiver units 3 to launch dummies from the associated launchers. The trainer then commands the dog to retrieve the dummies which have been launched. If the dog becomes distracted and veers off track, the trainer stimulates the dog by means of an appropriate stimulus signal transmitted to the receiver mounted on the dog's stimulus collar.

At the end of the training session, the various launchers can be easily found, even if they are well hidden, by using the thumbwheel switch 10 and tone control button 8 of transmitter 2 to selectively cause the various PZT's 21 to produce sounds that indicate their respective locations.

The above described invention provides a small, relatively inexpensive remote launcher control system that has much greater range in the closest prior art, and provides the convenience of simple continuity testing of connections between the various launchers and receiver units, and provides very convenient selection of which receiver unit the next signal is to be transmitted to and provides flexible and convenient selection of sounds which can be produced by each receiver unit in response to remote control signals from the transmitter unit.

While the invention has been described with reference to several particular embodiments thereof, those skilled in the art will be able to make the various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, although microcontroller 40 is described, the term "microcontroller" as used herein is intended to include various other microprocessors, microcontrollers, programmed logic arrays and the like which can be programmed and/or configured to perform the described functions. For example, the described receiver unit 3 could be easily adapted to provide remote control of other devices associated with animal training or animal use. The audio capability could be omitted, or the capability of controlling solenoids could be omitted, so that the receiver unit only provides the capability of generating audible sounds corresponding to various settings of thumbwheel switch 10.

What is claimed is:

1. A remotely controlled animal training device, comprising:
   (a) receiving circuitry for receiving control information signals including address information and function information from a remote transmitter;
   (b) a microcontroller coupled to receive demodulated address codes and function codes from the receiving circuitry;
   (c) a set switch for setting the remotely controlled animal training device to recognize only an address code received from a particular remote transmitter;
   (d) a first stored routine executed by the microcontroller for storing the address code received from the remote transmitter in response to actuation of the set switch;
   (e) a second stored routine executed by the microcontroller for operating on an address code contained in control information signals received by the remotely controlled animal training device and comparing the address code to the stored address code to determine if the remotely controlled animal training device is being addressed by the particular remote transmitter, the microcontroller then operating on a function code contained in control information signals received by the remotely controlled animal training device if the address code matches the stored address code;
   (f) a coupling device for coupling the control signal to a control input of the animal training device; and
   (g) a test circuit responsive to a test switch for testing continuity of the coupling by the coupling device.

2. The remotely controlled animal training device of claim 1 wherein the address code includes a sufficient number of bits to essentially eliminate the possibility of accidental actuation of any of a first predetermined number of remotely controlled animal training devices in a training area by any of a second predetermined number of remote transmitters in the training area.

3. The remotely controlled animal training device of claim 1 wherein the first stored routine executed by the microcontroller also stores the function code received from the particular remote transmitter in response to the actuation of the set switch.

4. A remotely controlled animal training device, comprising:
   (a) receiving circuitry for receiving signals from a remote transmitter including function information correlating various settings of a sound selection switch with various sound algorithms;
   (b) a microcontroller storing the various sound algorithms and coupled to receive demodulated function codes representing the function information from the receiving circuitry;
   (c) a set switch and a first stored routine executed by the microcontroller for storing the function codes in order to configure settings of the sound selection switch to correspond to predetermined sound algorithms, respectively;
   (d) a second stored routine executed by the microcontroller for executing a sound algorithm corresponding to a present setting of the selection switch in response to a sound command from the remote transmitter to produce audio signals determined by the sound algorithm; and
   (e) an acoustic transducer coupled to receive the audio signals and produce sounds in response to the audio signals;
   (f) a coupling device for coupling the control signal to a control input of the animal training device; and
   (g) a test circuit responsive to a test switch for testing continuity of the coupling by the coupling device.

5. A remotely controlled device for controlling a remotely controlled animal training device, comprising:
   (a) receiving circuitry for receiving control information signals from a remote transmitter;
   (b) a controller coupled to receive demodulated information from the receiving circuitry and adapted to generate a control signal in response to the demodulated information;
   (c) a coupling device for coupling the control signal to a control input of the animal training device; and
   (d) a test circuit responsive to a test switch for testing continuity of the coupling by the coupling device.

6. A remotely controlled device for controlling a remotely controlled animal training device, comprising:
   (a) receiving circuitry for receiving control information signals from a remote transmitter;
   (b) a controller coupled to receive demodulated information from the receiving circuitry and adapted to generate audio signals and a control signal in response to the demodulated information;
   (c) a coupling device for coupling the control signal to a control input of the animal training device;
   (d) an acoustic transducer coupled to receive the audio signals and produce predetermined sounds in response to the audio signals; and
   (e) a test circuit responsive to a test switch for testing continuity of the coupling by the coupling device.

7. A remotely controlled animal training device for controlling a launching device, comprising:
   (a) receiving circuitry for receiving control information signals from a remote transmitter;
   (b) a controller coupled to receive demodulated information from the receiving circuitry and adapted to generate audio signals and a launch signal in response to the demodulated information;
   (c) a coupling device for coupling the launch signal to control an input of the launching device that associated with the animal training device;
   (d) an acoustic transducer coupled to receive the audio signals and produce predetermined sounds in response to the audio signals; and
   (e) a test circuit responsive to a test switch for testing continuity of the coupling by the coupling device.

8. The remotely controlled animal training device of claim 7 wherein the test switch is included in the remotely controlled animal training device.

9. A remotely controlled animal training device for controlling a launching device, comprising:
   (a) receiving circuitry for receiving control information signals from a remote transmitter;
   (b) a microcontroller coupled to receive demodulated information from the receiving circuitry and adapted to generate audio signals and first and second launch signals in response to the demodulated information;
   (c) first and second coupling devices for coupling the first and second launch signals to control inputs of first and second launching devices, respectively that associated with the animal training device;

(d) an acoustic transducer coupled to receive the audio signals and produce predetermined sounds in response to the audio signals; and (e) first and second test circuits coupled to a test switch for testing continuity of the coupling by the first and second coupling devices.

10. The remotely controlled animal training device of claim 9 wherein the receiving circuitry includes an intermediate frequency (IF) circuit and a data slicer circuit, wherein the IF circuit demodulates the control information signals to produce demodulated control information signals, and wherein the data slicer circuit slices the demodulated control information signals to produce the demodulated information in the form of demodulated sliced control information signals.

11. The remotely controlled animal training device of claim 10 wherein the microcontroller operates to generate a predetermined reference voltage and apply it to a reference input of the data slicer circuit wherein the sliced demodulated control information signals swing about a voltage level based on the predetermined reference voltage.

12. The remotely controlled animal training device of claim 11 including a coupling capacitor coupling the demodulated and sliced control information signals to an input of the data slicer circuit.

13. The remotely controlled animal training device of claim 9 including means for attaching the remotely controlled animal training device to one of the first and second launching devices.

14. The remotely controlled animal training device of claim 9 wherein the acoustic transducer includes a piezoelectric (PZT) device.

15. The remotely controlled animal training device of claim 9 including a set switch for performing the function of setting address recognition circuitry in the remotely controlled animal training device to recognize an address code transmitted by a particular remote transmitter.

16. The remotely controlled animal training device of claim 9 wherein the control information includes address information and function information.

17. The remotely controlled animal training device of claim 16 wherein the address code includes a sufficient number of bits to essentially eliminate the possibility of accidental actuation of any of a first predetermined number of remotely controlled animal training devices in the training area by any of a second predetermined number of remote transmitters in the training area.

18. The remotely controlled animal training device of claim 9 wherein the microcontroller includes a stored program executed by the microcontroller to produce address code information recognized by the remotely controlled animal training device and function information for operating the remotely controlled animal training device.

19. A method of remotely controlling a launching device for animal training purposes, comprising:

(a) transmitting control information signals by means of a remote transmitter;

(b) receiving and demodulating the transmitted control information signals by means of receiving circuitry in a launch controller;

(c) operating on demodulated signals produced by the receiving circuitry by means of a controller to generate audio signals and first and second launch signals;

(d) coupling the first and second launch signals to control inputs of first and second launching devices, respectively that associated with an animal training device;

(e) producing predetermined sounds in response to the audio signals by means of an acoustic transducer; and (f) testing continuity of the coupling of the first and second launch signals to control inputs of first and second launching devices, respectively, by actuating a test switch the coupled to first and second test circuits.

20. The method of claim 19 including demodulating the control information signals to produce demodulated control information signals, and slicing the demodulated control information signals to produce the demodulated information in the form of demodulated and sliced control information signals.

21. The method of claim 20 including operating the microcontroller to generate a predetermined reference voltage and applying the predetermined reference voltage to a reference input of a data slicer circuit wherein the demodulated and sliced control information signals swing about a voltage level based on the predetermined reference voltage.

22. The method of claim 20 including coupling the demodulated control information signals to an input of the data slicer circuit by means of a coupling capacitor.

23. The method of claim 20 executing a stored program in the controller to operate on address code information included in the demodulated and sliced signals and comparing them with a stored predetermined address code to determine if the launch controller is being addressed, and to operate on function information included in the demodulated and sliced signals for operating the remotely controlled animal training device, wherein the address code includes a sufficient number of bits to essentially eliminate the possibility of accidental actuation of any of a first predetermined number of remotely controlled animal training devices in the training area by any of a second predetermined number of remote transmitters in the training area.

24. The remotely controlled animal training device of claim 19 including producing the predetermined sounds by means of a piezoelectric (PZT) device.

25. A remotely controlled animal training device for controlling a launching device, comprising:

(a) receiving circuitry for receiving control information signals from a remote transmitter;

(b) a microcontroller coupled to receive demodulated information from the receiving circuitry and adapted to generate audio signals and first and second launch signals in response to the demodulated information;

(c) first and second coupling devices for coupling the first and second launch signals to control inputs of first and second launching devices, respectively that associated with the animal training device;

(d) an acoustic transducer coupled to receive the audio signals and produce predetermined sounds in response to the audio signals; and (e) first and second test circuits coupled to a test switch for testing continuity of the coupling by the first and second coupling devices, the first test circuit includes a first transistor having a control terminal coupled to the first output of the microcontroller, a first terminal coupled to a reference conductor, and a second terminal coupled to the first coupling device and also coupled by a high resistance to a control terminal of a second transistor having a first terminal coupled to the reference conductor and a second conductor coupled through a first light emitting diode to a test signal produced in response to actuation of the test switch, wherein turning the first transistor off with the first coupling device connected to the control input of the first launching device causes the second transistor to conduct current through the first light emitting diode to indicate continuity of the coupling between the first coupling device and the control input of the first launching device the test switch is actuated without actuating the first launching device.

26. A method of remotely controlling a launching device for animal training purposes, comprising:
  (a) transmitting control information signals by means of a remote transmitter;
  (b) receiving and demodulating the transmitted control information signals by means of receiving circuitry in a launch controller;
  (c) operating on demodulated signals produced by the receiving circuitry by means of a controller to generate audio signals and first and second launch signals;
  (d) coupling the first and second launch signals to control inputs of first and second launching devices, respectively that associated with an animal training device;
  (e) producing predetermined sounds in response to the audio signals by means of an acoustic transducer; and
  (f) testing continuity of the coupling of the first and second launch signals to control inputs of first and second launching devices, respectively, by actuating a test switch the coupled to first and second test circuits wherein the first test circuit includes a first transistor having a control terminal coupled to the first output of the microcontroller, a first terminal coupled to a reference conductor, and a second terminal coupled to the first coupling device and also coupled by a high resistance to a control terminal of a second transistor having a first terminal coupled to the reference conductor and a second conductor coupled through a first light emitting diode to a test signal produced in response to actuation of the test switch, the method including indicating continuity of the coupling between the controller and the first launching device when the test switch is actuated without actuating the first launching device by turning the first transistor off and causing the second transistor to conduct current through the first light emitting diode in response to the coupling.

* * * * *